United States Patent Office 3,294,760
Patented Dec. 27, 1966

3,294,760
OXIDATIVE COUPLING OF ORGANIC DITHIOLS
Allan S. Hay, Schenectady, N.Y., assignor to General Electric Company, a corporation of New York
No Drawing. Filed Nov. 21, 1962, Ser. No. 239,317
13 Claims. (Cl. 260—79)

This application is a continuation-in-part of application Serial No. 117,836, filed June 19, 1961, now abandoned.

This invention relates to a self-condensation reaction resulting in the oxidative coupling of organic compounds containing at least one thiol group (—SH) directly bonded to a carbon atom of the organic neuclus, by a process which comprises reacting these compounds with oxygen in a homogeneous solution in the presence of a dissolved oxygen-carrying intermediate comprising an amine-basic cupric salt complex. More particularly, this invention relates to the reaction of oxygen with organic compounds containing a thiol group in a homogeneous solution also containing dissolved therein an oxygen-carrying intermediate comprising an amine-basic cupric salt complex. Specifically, this invention relates to the oxidation in homogeneous solution of organic compounds containing at least one thiol group, using as the oxygen-carrying intermediate, a solution comprising a basic cupric salt complex of an amine selected from the group consisting of aliphatic, primary, secondary and tertiary amines and cyclic secondary and tertiary amines. Such cyclic amines include cycloaliphatic and aromatic amines in which the amine nitrogen forms part of the ring and cycloaliphatic amines in which the cycloaliphatic group is a substituent on the amine nitrogen. Such amines are best described as amines having an amine nitrogen free of directly bonded aryl substituents.

I used the term "organic compound containing at least one thiol group" or "thiol compound" to designate those organic compounds containing one or more —SH groups directly attached to the carbon atom of an organic radical, i.e., thio acids, dithioacids, mercaptans, for example, thioalkanols, thiophenols, etc. This organic radical may be an aliphatic or aromatic radical which may have one or more substituents other than the thiol groups. Such a term therefore includes organic compounds containing at least one thiol group wherein one or more of the hydrogens of the aliphatic or aromatic nucleus have been substituted by, for example, a halogen, oxygen,

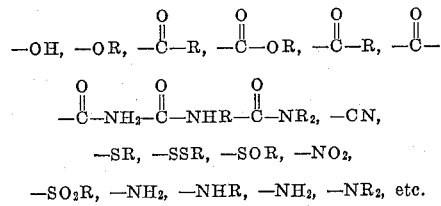

—SR, —SSR, —SOR, —NO₂,
—SO₂R, —NH₂, —NHR, —NH₂, —NR₂, etc.

In all of the above formulas, R may be one of the organic radicals such as defined above, but preferably is an alkyl or aryl group.

Oxidation of mercaptans to disulfides is well known, utilizing mild oxidizing agents that do not attack the product. Typical of the oxidizing agents are iodine and hydrogen peroxide. Air has sometimes been used as the oxidizing agent, but it has been found necessary to oxidize further by the use of hydrogen peroxide if high yields are to be obtained. These reactions usually require a considerable length of time and require stoichiometric quantities of oxidizing agents.

Unexpectedly, I have now discovered a generally rapid and inexpensive method of oxidatively coupling organic compounds containing at least one thiol group to produce various self-condensation products in high yields, which comprises oxidizing such sulfur-containing compounds with oxygen in a homogeneous solution in the presence of a dissolved oxygen-carrying intermediate comprising an amine-basic cupric salt complex, which does not need to be present in large amounts. The products produced by my process are dependent on the thiol compound used as the starting material. If the organic compound contains only one thiol group, the product is a disulfide as shown by the following equation:

Equation I

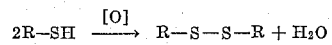

$$2R\text{—}SH \xrightarrow{[O]} R\text{—}S\text{—}S\text{—}R + H_2O$$

If the starting material is an organic compound having two thiol groups, the product is a linear polymer as shown by the following equation:

Equation II

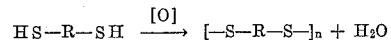

$$HS\text{—}R\text{—}SH \xrightarrow{[O]} [\text{—}S\text{—}R\text{—}S\text{—}]_n + H_2O$$

where $n$ is an integer representing the number of repeating units joined together through sulfur-to-sulfur bonds to form the polymer molecule, and is at least 2, but usually represents a value of at least 10.

When the organic compound contains three or more thiol groups, the product is a three-dimensional crosslinked, insoluble, infusible polymer. Since these products are extremely insoluble in known solvents, determination of their molecular weight is impossible by solution techniques.

It is to be understood that my reaction is not a direct oxidation, as illustrated, but an oxidation involving participation of the copper catalyst system as an oxygen-carrying intermediate.

The general method of carrying out my oxidation process is to pass an oxygen containing gas through a solution of one or more organic compounds, each containing at least one thiol group as the starting material, said solution also containing dissolved therein a complex comprising at least one basic cupric salt and at least one amine. The organic compounds containing at least one thiol group which can be oxidized by my process are represented by the following formula: $R(SH)_m$, where R is an aliphatic or aromatic radical which may have, as previously stated, one or more substituents other than the thiol groups, and $m$ is an integer and is at least 1 up to the number of replaceable hydrogen atoms on the organic nucleus. Preferably, $m$ is no more than 2, and R is an alkyl or aryl nucleous.

In providing the catalyst comprising a basic cupric salt and an amine, the particular copper salt used has no effect on the type of product obtained. I may start with either a cuprous or a cupric salt. The only requirement is that, if a cuprous salt is used, it must be capable of existing in the cupric state and must form a complex with the amine that is soluble in the reaction medium. The necessity for being able to exist in the cupric state is based on my belief that the oxidation of the thiol compounds is accomplished by the oxygen reacting with the amine-cuprous salt complex to form an intermediate activated amine-basic cupric salt complex that reacts with the thiol groups to form an unstable intermediate which decomposes, forming the self-condensation product of the thiol compound and water as the products and regenerates the amine-cuprous salt complex. This activated complex can also be formed by starting originally with a cupric salt in making the copper-amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkaline salt of the thiol compound being oxidatively coupled, by treating a cupric salt with an ion-exchange resin having exchangeable hydroxyl groups, etc. Preferably, these reactions are carried out in the presence of the amine to prevent precipitation of the basic cupric salt, but it is possible to add the amine later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt, without first converting them to the corresponding basic cupric salt, gave no oxidation of the thiol compounds in the presence of an amine.

Examples of amines which are free of aryl substituents directly bonded to the amine nitrogen that may be used in practicing my invention are the aliphatic amines, including cycloaliphatic amines wherein the cycloaliphatic group is substituted on the amine nitrogen, for example, mono-, di-, and trimethylamine, mono-, di- and triethylamine, mono-, di- and tripropylamine, mono-, di- and tributylamine, mono-, di- and trisecondary propylamine, mono-, di- and tribenzylamine, mono-, di- and tricyclohexylamine, mono, di- and triethanol-amine, ethylmethylamine, methylpropylamine, allylethylamine, methylcyclohexylamine, morpholine, methyl - n - butylamine, ethylisopropylamine, benzylmethylamine, octylbenzylamine, octylchlorobenzylamine, methylcyclohexylamine, methylphenethylamine, benzylethylamine, di(chlorophenethyl)amine,
1-methylamino-2-phenylpropane,
1-methylamino-4-pentene,
N-methyldiethylamine,
N-propyldimethylamine,
N-allyldiethylamine,
3-chloro-N,N-dimethylpropylamine,
N-butyldimethylamine,
N-isopropyldiethylamine,
N-benzyldimethylamine,
N-benzyldioctylamine,
N-chlorobenzyldioctylamine,
N-cyclohexyldimethylamine,
N-phenethyldimethylamine,
N-benzyl-N-methylethylamine,
N-bromobenzyl di(chlorophenethyl)amine,
N,N-dimethyl-2-phenylpropylamine,
N,N-dimethyl-4-pentenylamine,
N,N-diethyl-2-methylbutylamine, etc.

Examples of cyclic amines are the pyridines, such as pyridine itself, α-, β- and -collidine, α-, β- and -picoline, and 2,4-, 2,5-, 2-6- and 3,4-lutidine, quinuclidine, the dipyridyls, the pyrroles, the pyrrolidines, the piperidines, the diazoles, the triazoles, the diazines, the triazines, the quinolines, the diquinoyls, the isoquinolines, the tetrahydroquinolines, the tetrahydroisoquinolines, the phenanthrolines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, ethenoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines may be used in the form of tertiary amines whereby an alkyl hydrocarbon radical, such as those listed above for the ring substituents, is also attached to the amine nitrogen group, e.g., N-methylpyrrole,
N-methyltetrahydroquinoline,
N-methyltetrahydroisoquinoline,
N-methylpiperidine,
N-methylpyrrolidine,
N-methylimidazole,
N-methyl-1,2,4-triazole,
N-decylpiperidine,
N-decylpyrrolidine,
N-isobutylpiperidine,
1-decyl-2-methylpiperidine,
N-isopropylpyrrolidine,
N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except, of course, the amount used would only have to be that amount necessary to give the equivalent amount of amino groups. I may use polyamines wherein two or more amine groups, of the kind listed above for the monoamines, are attached to an aliphatic or cycloaliphatic nucleus, e.g., ethylene, diethyleneamine, propylene, butylene, pentylene, hexylene, cyclopentylene, cyclohexylene, etc. Typical examples of these aliphatic polyamines are the N,N' - dialkylethylenediamines, N,N,N' - trialkylethylenediamine, propanediamine, ethylenediamine, the N - alkylethylenediamines, the N - alkylpropanediamines, the N,N' - dialkylpropanediamines, the N,N,N' - trialkylpropanediamines, propanediamine, the N - alkylpropanediamines, the N,N' - dialkylbutanediamines, pentanediamine, the N - alkylpentanediamines, the N,N' - dialkylpentanediamines, the N,N,N' - trialkylpentanediamines, diethylenetriamine, the N - alkyldiethylenetriamines, the N' - alkyldiethylenetriamines, the N,N',N'' - trialkyldiethylenetriamines, the N,N',N' - trialkydiethylenetriamines, the N,N',N',N'' - tetraalkyldiethylenetriamines, the N',N',N'',N'' - tetraalkyldiethylenetramines, the cyclohexylenediamines, etc. Likewise, the polyamines may be mixed aliphatic and cyclic amines, e.g., aminoalkylpyridines, alkylaminoalkylpyridines, etc. I have, discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are N,N,N',N' - tetramethylethylenediamine, N,N,N',N' - tetraethylethylenediamine, N,N,N',N' - tetrapropylethylenediamine, N,N,N',N' - tetrabutylethylenediamine, N,N,N',N',N'' - pentamethyldiethylenetriamine, N-butyl-N-octyl-N',N'-dimethylethylenediamine, $N^1,N^1$ - dibenzyl - $N^2,N^2$ - dimethyl - 1,2 - propanediamine, 2 - chloro - N,N,N',N' - tetraethyl - 1,3 - propanediamine, N' - (3 - chloro-p-tolyl) - N,N - diethyl - N' - methyl-1,3 - propanediamine, 2 - ($\beta$ dimethylaminoethyl)pyridine, N,N,N',N' - tetrabenzyl - 3 - butene - 1,2, - diamine, N,N,N',N' - tetramethyl - 2 butyne - 1,4 - diamine, N,N,N',N' - tetraallylputrescine, N,N,N',N' - tetramethyl-1,4 - diphenylputrescine, N,N,N',N' - tetraisopropyl - 1,3-butanediamine, N,N,N',N' - tetramethyl - 1,3 - cyclopentanediamine, N,N,N',N' - tetramethyl - 1,4 - cyclohexanediamine, etc., N - ethyl - N,N',N' - trimethylethylenediamine; N - methyl - N,N',N' - triethylethylenediamine; N,N,N',N' - tetramethyl - 1,3 - propanediamine; N,N-dimethyl - N',N' - diethylethylenediamine; 1,2 - bis(2-methylpiperidino)ethane; N,N,N',N' - tetra - n - hexylethylenediamine; N,N,N',N' - tetra - n - amylethylenediamine; 1,2 - bispiperidinoethane; N,N,N',N' - tetraisobutylethylenediamine; N,N,N',N' - tetramethyl - 1,3-butanediamine; N,N,N',N' - tetramethyl - 1,2 - cyclohexanediamine; 1,2 - bis(2,6 - dimethylpiperidino)ethane; N,N - didecyl - N',N' - dimethylethylenediamine; N-methyl, N',N', - N'',N'' - tetraethyldiethylenetriamine; N-decyl - N,N',N' - triethylethylenediamine; 2 - ($\beta$ - piperidinoethyl)pyridine; 2 - ($\beta$ - dimethylaminoethyl) - 6-methylpyridine; 2 - ($\beta$ - dimethylaminoethyl)pyridine; 2-($\beta$ - morpholinoethyl) - pyridine; etc.

In general, tertiary amines are more oxidatively stable than primary and secondary amines. Also, my studies have shown that tertiary amines form a complex which is a more active catalyst for the oxidative coupling reaction forming the basis of this application. Therefore, I prefer tertiary amines as the amine to be used in forming the amine-basic cupric salt complex. I have found that a particularly active catalyst is formed by using a diamine in which the two tertiary amine groups are separated by two or three carbon atoms, numerous examples of which have been given above.

Many factors affect the stability of the complex of the amine and the copper salt. These factors are well known in the art and are discussed in detail in such texts as "The Chemistry of the Coordination Compounds" edited by John C. Bailar, Jr., Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex as indicated by the basicity of the amines I use as ligand also is an indication of the activity of the catalyst. Those amines which are strong bases form more active catalysts than amines which are weak bases. When the latter are used, typical examples of which are 3,5 - diphenylpyridine, phenanthridine, etc., I find that heating of the reaction mixture is desirable to cause the self-condensation reaction to proceed rapidly.

The effect of an N-aryl group in tertiary amines, e.g., aniline, N - methylaniline, N,N - dimethylaniline, methyldiphenylamine, etc., is to reduce the basicity of the amine so that its ability to form the copper complex is greatly reduced. Further, the stability of the amine under oxidizing conditions is greatly reduced. Because of these two effects, I prefer to use amines which are free of N-aryl substituents.

Some of the thiol compounds which may be oxidized by my process include methyl mercaptan, ethyl mercaptan, propyl mercaptan, butyl mercaptan, dodecyl mercaptan, thiophenol, thiocresol, thioxylenol, thionaphthol, ethanedithiol (ethylene dithioglycol), propanetrithiol (trithioglycerol, butanedithiol, octanedithiol, decyldithiol, dodecyldithiol; the benzenedithiols, for example, benzene-1,4-dithiol (dithiohydroquinone), benzene-1,3-dithiol, benzene-1,2-dithiol; the benzenetrithiols; the naphthalenedithiols, including the above-named compounds wherein one or more of the hydrogen atoms are substituted with a substituent, for example, a halogen, oxygen,

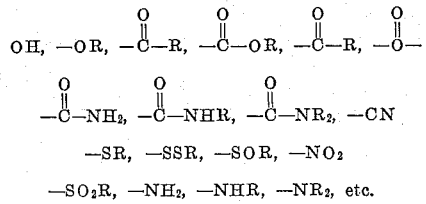

specific examples of which are 2-mercaptoethanol (ethylene monothioglycol), 3 - hydroxypropane - 1,2 - dithiol, thioacetic acid, dithioacetic acid, chloroethylmercaptan, bromothiophenol, mercaptobutylamide, mercaptoethylacetate, N - butylmercaptopropionamide, 3 - mercapto-N,N - dimethylpropylamine, 2 - mercaptopropionitrile, p - nitrothiophenol, etc. Since these substituents do not enter into the actual coupling reaction, although it is possible that they might be oxidized, there is no limitation as to what the substituents may be. However, from a practical standpoint and because of their extremely interesting properties, I prefer that the starting material be an alkyl or aryl mercaptan or an alkylene or arylene dimercaptan.

Surprisingly, I have found that the organic compounds containing two thiol groups will produce fusible polymers, while two or more such organic compounds may be copolymerized to form fusible copolymers. Both the polymers and copolymers can be chain stopped to control molecular weight by inclusion of an organic compound containing a single thiol group or such a chain stopper may be added after the desired degree of polymerization is obtained to stop further polymerization. Most of these polymers or copolymers are soluble in a wide variety of solvents, for example, in chlorobenzene, nitrobenzene, and chlorinated hydrocarbons, such as tetrachloroethane. When these solutions are cast, for example, on a glass plate and the solvent evaporated, they produce tough, transparent films. Likewise, the polymers and copolymers can be molded under heat and pressure to various shapes dependent upon the mold used.

My polymers may also be blended with up to 75 weight percent of one or more polymers, typical examples of which are: polymerized alkenes having from 3 to 8 carbon atoms, for example, polyethylene, polypropene (sometimes called polypropylene), polybutene (polybutylene), polyisobutene (polyisobutylene), polypentene, polyhexene, polyheptene, polyoctene, etc.; polymers containing polymerized conjugated butadiene, for example, polybutadiene itself, polyisoprene, polychloroprene, as well as copolymers of other materials, for example, copolymers of butadiene and styrene containing from 20 to 80 percent by weight butadiene, an example of which is GR–S rubber; copolymers of butadiene and acrylonitrile, wherein the butadiene may comprise from about 55 to 80% of the total weight of the butadiene and the acrylonitrile, an example of which is Hycar-OR; organopolysiloxanes having carbon-to-silicon linkages such as those disclosed and claimed in Agens Patent 2,448,756, Sprung Patents 2,448,556 and 2,484,595, Krieble et al. Patent 2,457,688 Hyde Patent 2,490,357, Marsden Patent 2,521,528, Warrick Patent 2,541,137, etc.; polymers of monohydric alcohol esters of acrylic acid, for example, polymeric methyl methacrylate, polymeric butylacrylate, such polymeric materials ranging from both tough, pliable, rubber-like substances in the case of polymeric methyl acrylate, to softer and more elastic in the case of polymeric longer-chain alkyl acrylates (examples of polymeric alkyl alkylates which may be employed are more particularly described in Semegén Patents 2,411,899, 2,412,475 and 2,412,476); polystyrene, chlorosulfonated polyethylenes, chlorinated polyethylenes, chlorinated polyolefins, etc. Mixtures of these above-described polymeric compositions may also be incorporated into the polymeric compositions of this invention. The polymeric compositions prepared from the dithiols may be used alone or in conjunction with fillers to modify the properties thereof. Particularly useful fillers are the carbon blacks, various forms of silica, especially the silica aerogels, zerogels, and the fume silicas, which may if desired be treated with a hydrophobic agent such as organosilicon halides, such as those disclosed in U.S. Patents 2,657,149—Iler, 2,510,661—Safford, 2,563,555—Safford, and 2,967,168—Hurd. Other fillers are the naturally-occurring clays, for example, Catalpo clay, diatomaceous earth, chromic oxide, titanium dioxide, ferric oxide, calcium carbonate, cadmium sulfide, asbestos, wood flour, cellulose fibers, mineral fibers, glass fibers, alumina, lithipone, talc, calcium silicate, etc.

Dyes and pigments may be added to obtain the desired color and plasticizers may be added if desired to obtain any desired degree of flexibility.

Although I do not want to be bound by my theory, I believe that one mole of a copper salt forms a complex with two moles of amine nitrogen in the amine, e.g., a mole of monoamine has one mole of amine nitrogen, a diamine has two moles of amine nitrogen, etc. However, it is possible to carry out my reaction with as little as 0.66 mole of amine nitrogen to one mole of copper. However, it may be that in this case only part of the copper is complexes or polynuclear complexes may form. The complex formed from a cuprous salt and an amine can react with oxygen to form an oxidized intermediate, while the complex formed from a cupric salt is already in the form of the oxidized intermediate which in some manner can form a complex with the thiol compound. This latter complex activates the thiol group in some way so that self-condensation occurs between thiol groups on different molecules, with the regeneration of the catalyst in the reduced or cuprous state, which can react with additional oxygen to form the active oxidized intermediate. This belief is based on the fact that, if I pass oxygen into my catalyst system prepared from a cuprous salt until it is saturated, or treat one equivalent of a cupric salt with one equivalent of a base, and then add the thiol compound with no further addition of oxygen, one thiol group is oxidized for each mole of catalyst present. By such a reaction, I can cause the self-condensation of thiol compounds without actually passing oxygen into the reaction system containing the thiol reactant. These reactions are illustrated by the following equations using R—SH to represent a monothiol compound and (A) to represent a monoamine, KOH as representative of a typical base and CuCl and CuCl$_2$ as representative of typical cuprous and cupric salts.

*Preparation of amine-basic cupric salt complex*

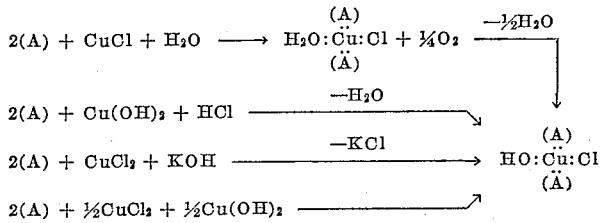

*Reaction with the thiol*

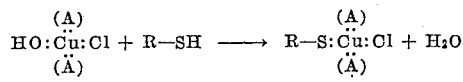

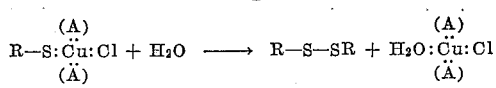

As is readily apparent from Equations I and II, when a compound having more than one thiol group is reacted, the product is a polymer rather than the dithiol compound. It will be noted that although the above is theoretical, it does provide indications as to the role of water in determining the nature of the product and how the complex is regenerated and acts as the oxygen-carrying intermediate. Since water is a product of the reaction and completely anhydrous reagents are extremely difficult to obtain, I have never found it necessary to actually add water to the reaction mixture, even when starting with a cuprous salt.

As will be evident from the above equations, it is desirable when starting with a cupric salt to add one equivalent of base for each mole of copper salt to most effectively use all of the copper. If less base is used, then only the equivalent amount of cupric salt is converted to the catalytically active amine-basic cupric salt complex in which the ratio of hydroxyl groups to copper atoms in the complex is one to one, leaving the balance of the cupric salt unchanged which, even in the form of its amine complex, is an inactive ingredient in the system. Likewise, if more than one equivalent of base is added, then some or all of the cupric salt is converted into cupric hydroxide, which likewise is an inactive ingredient even in the form of its amine complex. In effect, the addition of more or less than one equivalent of base, i.e. one mole of hydroxyl ion, to a mole of cupric salt results in the same effect as though less of the cupric salt had been used to form the amine-basic cupric salt complex. This same effect is noted if more than one equivalent of acid, i.e., one mole of hydrogen ions or one mole of a cupric salt is added to one mole of cupric hydroxide in forming the complex.

The cupric salts of carboxylic acids, for example, cupric acetate, cupric benzoate, etc., represent a unique class of cupric salts. They will form a complex with amines which, in the presence of oxygen, will produce disulfide products but these products are much lower in molecular weight and the reaction is slower than if the cupric carboxylate had been converted to the corresponding amine-basic cupric carboxylate complex. Evidently because of the weakly acidic nature of carboxylic acids, the thiol compound and the cupric carboxylate complex are in equilibrium with the thiol complex and the carboxylic acid according to the following equation, where again R—SH represents the thiol compound, AcO represents the carboxylate ion, and (A) represents a monoamine.

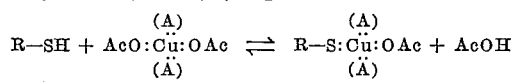

Apparently the equilibrium is predominantly to the left-hand side of the equation, since the slow reaction indicates a low concentration of the active species.

It will be noted that this thiol-cupric complex on the right-hand side of the equation is the same as would be obtained from a cuprous salt and oxygen or a cupric salt and a base when reacted with a thiol compound in a non-equilibrium reaction. In the specification and claims, I use the term "amine-basic cupric salt complex in which the ratio of hydroxyl groups to copper atoms in the complex is one to one" to denote the catalytically active complex described above, which acts or is used as the oxygen-carrying intermediate in the oxidation of the thiol compounds to self-condensation products. As shown above, this complex can be obtained either from cuprous or cupric salts and oxidizes the thiol compounds to self-condensation products while the copper in the complex is reduced to the cuprous state.

If the quantity of thiol compound to be reacted is greater than can be oxidized by the amount of complex present, oxygen is introduced into the reaction mixture to reoxidize the cuprous complex back to the basic cupric complex. Whether this is done or whether the stoichiometric amount of the amine-basic cupric salt is used to oxidize the thiol compound, the net overall reaction in either case is the reaction of oxygen, either elemental or from the complex with the thiol compound. This reaction, therefore, may best be described as the reaction of thiols with oxygen using the amine-basic cupric complex as the oxygen-carrying intermediate.

I may use mixtures of amines and mixtures of copper salts for forming my catalyst system. Preferably, the copper-amine complex is dissolved in the solvent before the organic thiol compound is added. In some cases, the solution of the copper-amine complex may be hastened by heating the mixture, by bubbling in air or oxygen, or a combination thereof. In order to effectively use all of the copper, enough amine should be added to complex and thereby dissolve all of the added copper salt. Larger excesses of amine do not adversely affect the reaction, and in some cases may be desirable in order to completely dissolve all of the organic thiol compound and to act as the solvent for the reaction product. Other solvents, such as alcohols, ketones, hydrocarbons, chlorohydrocarbons, nitrohydrocarbons, ethers, esters, amides, mixed ether esters, sulfoxides, etc., may be present in the reaction system, providing they do not interfere or enter into the oxidation reaction.

Oxygen or an oxygen-containing gas is bubbled into the reaction mixture causing an exothermic reaction to take place with the formation of water as a by-product. It is preferable to prevent the escape of this water of reaction from the reaction vessel when carrying out the reaction by the batch process, or to control the escape of water so that there is always one mole of water present for each mole of copper-amine catalyst when carrying out the reaction by the batch or continuous process. This can be done by carrying out the reaction under reflux conditions, in a closed reaction system at superatmospheric pressure, by cooling, in the presence of desiccants, or any combination thereof, with a controlled removal of water if desired. This can be done, for example, by sweeping with an inert gas, by carrying out the reaction at subatmospheric pressure, by azeotropic distillation, by the use of open reaction vessels, by heat or any combination thereof. In carrying out my reaction, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of all of the water as it is formed, if desired.

Since the reaction is usually exothermic, the reaction can become overheated, resulting in the formation of undesirable products. This is especially true in the formation of the polymeric products, where I have noticed that if I do not control the heat of reaction, the resins tend to discolor. Generally, I initiate the oxidation reaction at as low a temperature as the reaction will start, as evidenced by the reaction becoming exothermic. Usually, I control my oxidation reaction so that the maximum temperature does not exceed 100° C., and preferably does not exceed 80° C. The heat of reaction may be removed, for example, by radiation, convection, or by cooling coils which can either be immersed in or surround the reaction vessel.

Ordinarily, I continue the passage of oxygen into the reaction mixture until no more heat is generated or the desired amount of oxygen is absorbed. Alternatively, I may intermittently or continuously add the same or a different organic thiol compound than the starting material during the oxidation reaction to produce mixed disulfide products which have a different structure than if the mixed thiol compounds were used as starting materials. This technique is more applicable in the formation of the polymeric products than it is to the making of the simple organic disulfide from a monothiol compound.

To terminate the reaction, I destroy the catalyst system by the addition of an acid, preferably a mineral acid such as hydrochloric or sulfuric acid, which reacts with the amine and copper salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product, or I may add a chelating agent which inactivates the copper. After the product is precipitated, it may be redissolved and reprecipitated any desirable number of times to remove the impurities if they are soluble materials. Finally, it is filtered and washed free of any remaining contaminants. When dry, the product may be used as a chemical compound for the preparation of other materials, or if it is a polymer it may be fabricated into various shapes, or it may be dissolved in solvents to prepare solutions which can be used in the preparation of coatings, fibers, etc.

In order that those skilled in the art may better understand my invention, the following examples are given which are illustrative of the practice of my invention, and are not intended for purposes of limitation. All parts are by weight unless otherwise stated.

EXAMPLE 1

Oxygen was bubbled through a vigorously stirred solution of 1 gram of cuprous chloride and 10 grams of thio-β-naphthol in 100 ml. of pyridine. In 3 minutes, the temperature rose from 30° C. to 47° C. and then slowly dropped. A precipitate settled out of the solution which was filtered and washed with dilute hydrochloric acid, yielding 7.65 grams of a solid having a melting point of 139–142° C. The mother liquor was diluted with a large quantity of water to yield a further amount of product. The compound was identified as β-naphthyl disulfide having the following analysis:

Calculated for $C_{20}H_{14}S_2$: carbon, 75.5; hydrogen, 4.4; sulfur, 20.1. Found: carbon, 75.6; hydrogen, 4.5; sulfur, 20.4.

EXAMPLE 2

Oxygen was bubbled through a vigorously stirred solution of 1 gram of cuprous chloride and 5 grams of 2,6-dimethylthiophenol in 100 ml. of pyridine. In 2 minutes the temperature of the reaction mixture rose from 30° C. to 43° C. After a further 10 minutes of reaction, the reaction mixture was diluted with a large quantity of water to precipitate the product which was filtered and washed with dilute hydrocholric acid. A yield of 4.70 grams of a light yellow solid, melting point 102–104° C. was obtained. Recrystallization from alcohol raised the melting point to 105–108° C. The product was identified as bis(2,6-dimethylphenyl)-disulfide having the following analysis:

Calculated for $C_{16}H_{18}S_2$: carbon, 70.0; hydrogen, 6.6; sulfur, 23.4. Found: carbon, 69.0; hydrogen, 6.6; sulfur, 27.1.

EXAMPLE 3

When Example 2 was repeated but using 5 grams of 2,4,6-trimethylthiophenol in place of the 2,6-dimethylthiophenol, there was obtained 4.6 grams of a light yellow solid which was identified as bis(2,4,6-trimethylphenyl)-disulfide which had a melting point of 123–127° C.

EXAMPLE 4

Oxygen was passed through a vigorously stirred solution of 1 gram of cuprous chloride, 2.9 grams of N-n-decyl-N,N',N'-triethylethylenediamine, and 3 grams of α,α'-dimercapto-p-xylene and 135 ml. of pyridine. In 17 minutes, the temperature rose from 28° C. to 38.5°. A precipitate settled out of the reaction mixture which was removed by filtration and washed with methanol containing a small amount of hydrochloric acid. There was obtained 1.3 grams of a polymer which begins to soften at about 190° C. When molded for 1 minute under 6,000 p.s.i., at 210° C., a flexible film was obtained. An additional 1 gram of polymer was obtained by diluting the filtrate with a large quantity of water. This polymer had a softening point of 107-110° C.

EXAMPLE 5

Oxygen was passed through a vigorously stirred solution of 2 grams of cuprous chloride, 4.5 grams of N,N,N',N'-tetramethylethylenediamine and 5 grams of toluene-3,4-dithiol, in 250 ml. of pyridine, which was heated on a water bath at 27° C. After 15 minutes the reaction mixture was precipitated in methanol, filtered and washed with methanol containing a small amount of hydrochloric acid. The precipitate was dissolved in chloroform, filtered and reprecipitated in methanol, to yield 2.9 grams of a colorless polymer which begins to soften at about 118° C. This polymer has the repeating structural unit corresponding to the following formula where $n$ represents the number of units joined together through sulfur-to-sulfur bonds to form the polymer molecule

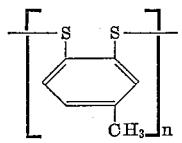

and has the following analysis for carbon and hydrogen:
Calculated for $C_7H_6S_2$: carbon, 54.5; hydrogen, 3.9.
Found: carbon, 54.4; hydrogen, 3.9.

*Example 6*

Oxygen was passed through a vigorously stirred solution of 0.5 gram of cuprous chloride and 1.5 grams of naphthalene-1,5-dithiol in 300 ml. of pyridine and 100 ml. of nitrobenzene. After 10 minutes the reaction mixture was precipitated in methanol, filtered and washed with methanol containing a slight amount of hydrochloric acid, to yield 1.4 grams of a cream colored polymer which begins to soften at about 250° C. and is insoluble in all the common organic solvents. This polymer has the repeating structural unit where $n$ represents the number of units joined together through sulfur-to-sulfur bonds to form the polymer molecule

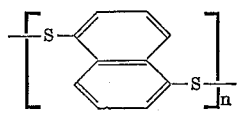

and the following analysis for carbon and hydrogen:
Calculated for $C_{10}H_6S_2$: carbon, 63.1; hydrogen, 3.2.
Found: carbon, 62.6; hydrogen, 3.4.

*Example 7*

Oxygen was bubbled through a vigorously stirred solution of 1 gram of cuprous chloride, 3.2 grams of N,N,N',N'-tetramethylethylenediamine, and 2.7 grams of ethanedithiol, in 125 ml. of pyridine. In 9 minutes, the temperature rose 13° C. above the starting temperature. The reaction mixture was precipitated in methanol, filtered and washed with methanol containing a small amount of hydrochloric acid, to obtain 1.2 grams of a colorless polymer that begins to soften at about 130° C. This polymer has the repeating structural unit

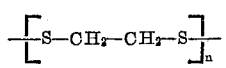

in which $n$ represents the number of units which are joined together through sulfur-to-sulfur bonds to form the polymer molecule. This polymer was dissolved in s-tetrachloroethane at 135° C. The solution was cast on a glass plate to yield a flexible film. The polymer was also pressed for 1 minute under 2,000 p.s.i at 135° C. to also produce a film.

Polymers softening at about 40° C. were obtained when 1,9-nonanedithiol and 1,10-decanedithiol were substituted for the ethanedithiol and a polymer softening at 85° C. was obtained when 1,3-propanedithiol was substituted for the ethanedithiol in the procedure of Example 7.

*Example 8*

Oxygen was bubbled through a vigorously stirred solution of 0.5 gram of cuprous chloride, 0.45 gram of N,N-dimethylamine dissolved in 140 ml. of N,N-dimethylacetamide. Over a 12-minute period, 5 grams of p-chlorothiophenol were added to the solution. The temperature rose from 29° C. to 34° C. The reaction was continued for an additional 23 minutes, after which the product was precipitated by pouring the reaction mixture into water and filtering off the product which was identified as p,p'-dichlorodiphenyldisulfide.

When an equivalent amount of methylamine is substituted for the N,N-dimethylamine, the reaction proceeds as readily to produce the same p,p'-dichlorodiphenyldisulfide product.

*Example 9*

Oxygen was bubbled through a vigorously stirred solution of 0.85 gram of cupric chloride dihydrate and 0.6 gram of N,N,N',N', - tetramethylethylenediamine dissolved in 140 ml. of acetone, cooled in an ice bath to 0° C. When 5 grams of p-chlorophenylthiophenol were added, no reaction occurred. However, when 0.28 gram of potassium hydroxide dissolved in 10 ml. of ethanol was added to the reaction mixture, an immediate reaction occurred with the temperature rising to 10° C. After a total reaction time of 15 minutes, the reaction mixture was precipitated in water and the product recovered by filtration and identified as p,p'-dichlorodiphenyldisulfide.

This example illustrates that a cupric salt such as cupric chloride cannot be used alone without first being converted to the basic cupric salt, which then functions in the same way as the catalyst produced from the cuprous salt.

From the foregoing description, it is readily apparent that the organic disulfides may be readily prepared by my method and these materials may be used as chemical intermediates for the preparation of interesting and valuable organic compounds having many and varied uses in the chemical field, for example, as insecticides and rubber accelerators, antioxidants for polymers, especially when used with diphenoquinones, etc. The polymers may be compacted and molded into many useful objects, or may be produced in the form of films. They may be used as coating materials or impregnants for porous materials or as binders for ceramic and metal products, for example, for the preparation of grinding and abrasive wheels. Both the non-polymeric disulfides and the polymeric sulfides may be thermally or chemically decomposed either alone or in the presence of other materials to produce sulfur and sulfur-containing compounds in situ. My process may likewise be aplied not only to the making of useful materials from the commercially available organic thiol compounds, but also to the purification of synthetically produced or naturally occurring materials containing organic thiol compounds as impurities, such as the removal of naturally occurring organic thiol compounds from petroleum.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of producing a soluble, sulphur-containing polymer which comprises reacting oxygen with an organic dithiol, said reaction being carried out in a homogeneous solution in an organic solvent of (a) said dithiol and (b) as the active catalyst and oxygen-carrying intermediate, an amine-basic cupric salt complex in which the ratio of hydroxyl groups to copper atoms in the complex is one to one, the amine of said complex being free of a N-aryl substituent.

2. The process of claim 1 wherein the organic dithiol is a hydrocarbon dithiol.

3. The process of claim 1 wherein the organic dithiol is an aliphatic dithiol.

4. The process of claim 1 wherein the organic dithiol is an alkylene dithiol.

5. The process of claim 1 wherein the organic dithiol is an aromatic dithiol.

6. The process of claim 1 wherein the organic dithiol is an arylene dithiol.

7. The process of claim 1 wherein the organic dithiol is ethanedithiol.

8. The process of claim 1 wherein the organic dithiol is 1,3-propanedithiol.

9. The process of claim 1 wherein the organic dithiol is 1,9-nonanedithiol.

10. The process of claim 1 wherein the organic dithiol is 1,10-decanedithiol.

11. The process of claim 1 wherein the organic dithiol is α,α'-dimercapto-p-xylene.

12. The process of claim 1 wherein the organic dithiol is toluene-3,4-dithiol.

13. The process of claim 1 wherein the organic dithiol is naphthalene-1,5-dithiol.

References Cited by the Examiner

UNITED STATES PATENTS

| | | | |
|---|---|---|---|
| 2,195,380 | 3/1940 | Patrick | 260—79.1 XR |
| 2,255,417 | 9/1941 | Ellis et al. | 208—191 XR |
| 2,744,854 | 5/1956 | Urban | 208—191 |
| 2,790,008 | 4/1957 | Warner | 260—608 |
| 2,792,334 | 5/1957 | Meguerian | 208—195 |
| 2,831,896 | 4/1958 | Holly | 260—79 |
| 3,036,049 | 5/1962 | Leuchten et al. | 260—79.1 |
| 3,054,781 | 9/1962 | Tsou | 260—79.1 |
| 3,098,103 | 7/1963 | Reifscheider | 260—609 |
| 3,206,467 | 9/1965 | Reifscheider | 260—609 |

LEON J. BERCOVITZ, *Primary Examiner.*

M. P. HENDRICKSON, M. I. MARQUIS,
*Assistant Examiners.*